United States Patent [19]
Niessner et al.

[11] Patent Number: 5,829,814
[45] Date of Patent: Nov. 3, 1998

[54] COVER FLAP AND HINGE ASSEMBLY AND METHOD OF MAKING SAME FOR PASSENGER VEHICLE GLOVE COMPARTMENTS

[75] Inventors: Harry Niessner, Böblingen; Santiago Duenas, Ammerbuch; Helmut Wagner, Laurentiusstrasse, all of Germany

[73] Assignee: Mercedes-Benz AG, Stuttgart, Germany

[21] Appl. No.: 609,766

[22] Filed: Feb. 23, 1996

[30] Foreign Application Priority Data

Feb. 23, 1995 [DE] Germany ......................... 195 06 295.7

[51] Int. Cl.⁶ ........................................................ B60N 3/12
[52] U.S. Cl. ............................ 296/37.12; 16/249; 16/383
[58] Field of Search ........................... 296/37.12; 16/249, 16/383

[56] References Cited

U.S. PATENT DOCUMENTS

| | | |
|---|---|---|
| 1,490,956 | 4/1924 | Binder . |
| 2,027,888 | 1/1936 | Solomon .................................. 16/249 |
| 4,653,144 | 3/1987 | Lautenschlager, Jr. ............... 16/249 X |
| 5,143,265 | 9/1992 | Schultz .............................. 296/37.12 X |

FOREIGN PATENT DOCUMENTS

| | | |
|---|---|---|
| 3001071A1 | 7/1981 | Germany . |
| 4142598C1 | 12/1992 | Germany . |
| 2131079 | 6/1984 | United Kingdom . |
| 2178791 | 2/1987 | United Kingdom ..................... 16/249 |

OTHER PUBLICATIONS

British Search Report Apr. 23, 1996 Great Britain.

*Primary Examiner*—Joseph D. Pape
*Attorney, Agent, or Firm*—Evenson, McKeown, Edwards & Lenahan, P.L.L.C.

[57] ABSTRACT

For the vertical alignment of a hinged covering flap, in particular of a glove-compartment cover, it is proposed to insert the hinge leaf on the cover side, accompanied by the spring-loaded engagement of teeth which protrude and engage into a row of teeth, into a channel fixedly disposed with respect to the vehicle body, and to secure the resulting alignment position with the use of a locking clip.

28 Claims, 3 Drawing Sheets

COVER FLAP AND HINGE ASSEMBLY AND METHOD OF MAKING SAME FOR PASSENGER VEHICLE GLOVE COMPARTMENTS

BACKGROUND AND SUMMARY OF THE INVENTION

The invention relates to a hinge for covering flaps in motor vehicles. Especially preferred embodiments of the invention relate to a hinge for a glove-compartment cover with two hinge leaves coupled in an articulated manner. With such a hinge, it is possible for the hinge leaf on the cover side to be fixed such that it is secured in the vertical direction by inserting a tongue into a channel which is preferably assigned to a main cover body, and for the other hinge leaf to be fastened to a fixed bodywork part after alignment has taken place in the longitudinal and transverse directions of the vehicle and, in addition, a device is provided for aligning the glove-compartment cover in the vertical direction.

A hinge designed in this manner, the two hinge leaves of which are connected to one another via a link coupled in an articulated manner, is disclosed in German Patent Document DE 41 42 598 C1. In a first embodiment the link is supported by means of a helical coil compression spring on the hinge leaf assigned to the fixed bodywork part and the glove-compartment cover can be moved towards the fixed bodywork part or away from it by turning a screw in order to align the cover. The threaded part of the screw penetrates the link. In this arrangement, the adjusting process has proven difficult and is time-consuming because the screw head is covered by a covering and is accessible only through an opening in said covering, and, in addition, it is not possible for any adjustment position to be checked until the glove-compartment cover has been closed.

In a second exemplary embodiment, the link is held by a double collar screw, the threaded stem of which, which is not visible, can be turned by means of a tool, after a covering has been removed, for the vertical adjustment of the closed glove-compartment cover. This adjusting process has also proven difficult since the positioning of the tool is not directly visible and the adjustment position, which is reached with difficulty, still has to be secured by means of a lock nut.

An object of the invention is to configure the vertical alignment such that it is simpler and, at the same time, such that the adjustment can be carried out without the use of a tool and with the glove-compartment cover closed.

This object is achieved in the case of preferred embodiments of the present invention which includes a cover flap and hinge assembly for a motor vehicle, comprising a cover flap, a hinge tongue connected to the cover flap, a hinge tongue mounting channel fixable in position on a vehicle body, at least one set of first adjusting teeth on the channel, at least one set of second adjusting teeth on the hinge tongue, said first and second sets of adjusting teeth being configured to elastically interengage and thereby accommodate adjusting of the hinge tongue in said channel by manual movement of the cover flap while in its closed position.

In a preferred exemplary embodiment of the invention, two spaced-apart rows of teeth which face one another are provided, and two racks with consecutive teeth engage into each row of teeth. As a result, the adjustment made can be retained, even in the case of flaps having a relatively great inherent weight, until the alignment position is secured.

Preferred embodiments of the invention are also contemplated with a single row of teeth or more than two rows of teeth.

In a further development of the invention, the spacing of the teeth in the rows of teeth at one side is many times smaller than that of the teeth on the other side. As a result, it is possible for the teeth to be of stable design despite small adjusting steps.

In especially preferred embodiments, the vertical adjustment position of the glove compartment cover can be secured rapidly and in a simple manner if the securing member is designed as a U-shaped clip, the two limbs of which penetrate slots in the two side walls of the channel, which lie opposite one another.

In other preferred embodiments the clip is T-shaped with the T-leg penetrating a corresponding slot in the channel walls.

For insertion which is easy and ultimately secured, the clip preferably has approach bevels and integrally formed lugs. On reaching the securing position the lugs engage over assigned latching points on the one wide wall of the channel.

Other objects, advantages and novel features of the present invention will become apparent from the following detailed description of the invention when considered in conjunction with the accompanying drawings.

DETAILED DESCRIPTION OF THE DRAWINGS

Figure 1:
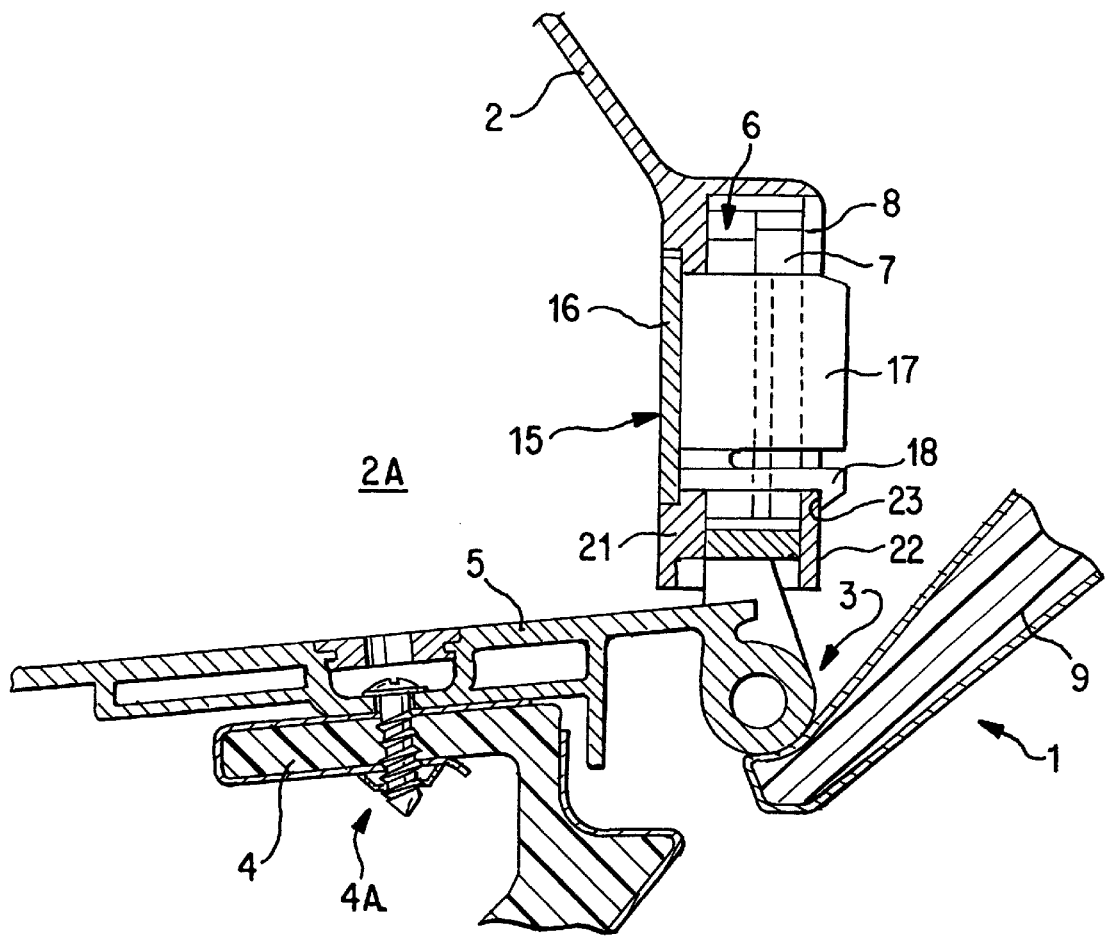
FIG. 1 is a partial, sectional view showing a glove-compartment cover held on a vehicle bodywork side by a hinge assembly constructed according to a preferred embodiment of the present invention.
Figure 1A:
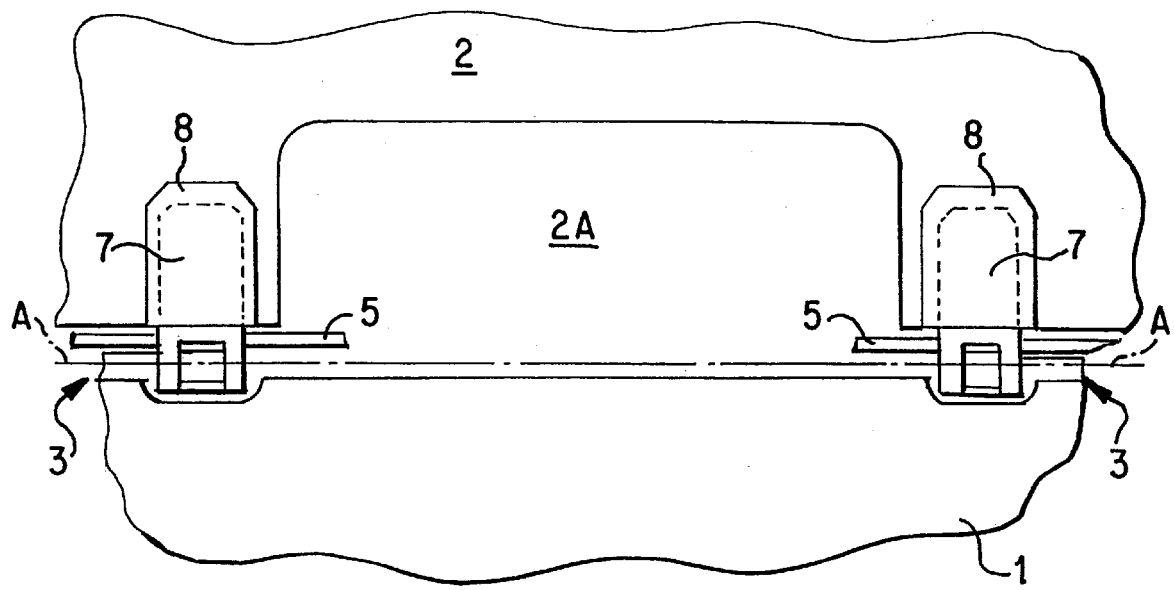
FIG. 1A is a schematic frontal view of a glove-compartment opening depicting the location of the hinge assembly tongue of FIG. 1, with the cover open and only partly shown for illustrative purposes.

A glove-compartment cover 1 for a motor vehicle, only part of which is shown so as not to obscure the invention, has a main body part 2 which defines a glove compartment opening 2A and is fixed with respect to fixed vehicle body parts. Cover 1 is made of plastic and is fastened to fixed bodywork parts 4 by means of two spaced-apart hinges 3, only one of which is visible in FIG. 1. See FIG. 1A for the location of the hinges 3 and the below described channels 8 and tongues 7 at opposite lateral sides of glove compartment opening 2A.

Each hinge 3 is provided with a first hinge leaf 5 which can be fastened such that it can be adjusted relative to the bodywork part 4 in both the longitudinal and transverse direction of the vehicle. By means of a second hinge leaf 6 which is designed as a tongue 7, the hinge 3 is held such that it can be adjusted vertically, in a manner described in more detail below. Tongue 7 is received by a channel 8 integrally formed on the main body part 2. The main body part 2 is provided on the visible side with a panelling part conforming to cover panelling part 9 of cover 1. In practical preferred embodiments parts 2 and 4 form portions of a dashboard assembly disposed in front of a vehicle passenger space.

The cover 1 is mounted for pivotal movement about a hinge pivot axis A—A between respective open and closed positions of the opening 2A when in an installed in-use position on a vehicle.

Figure 2:
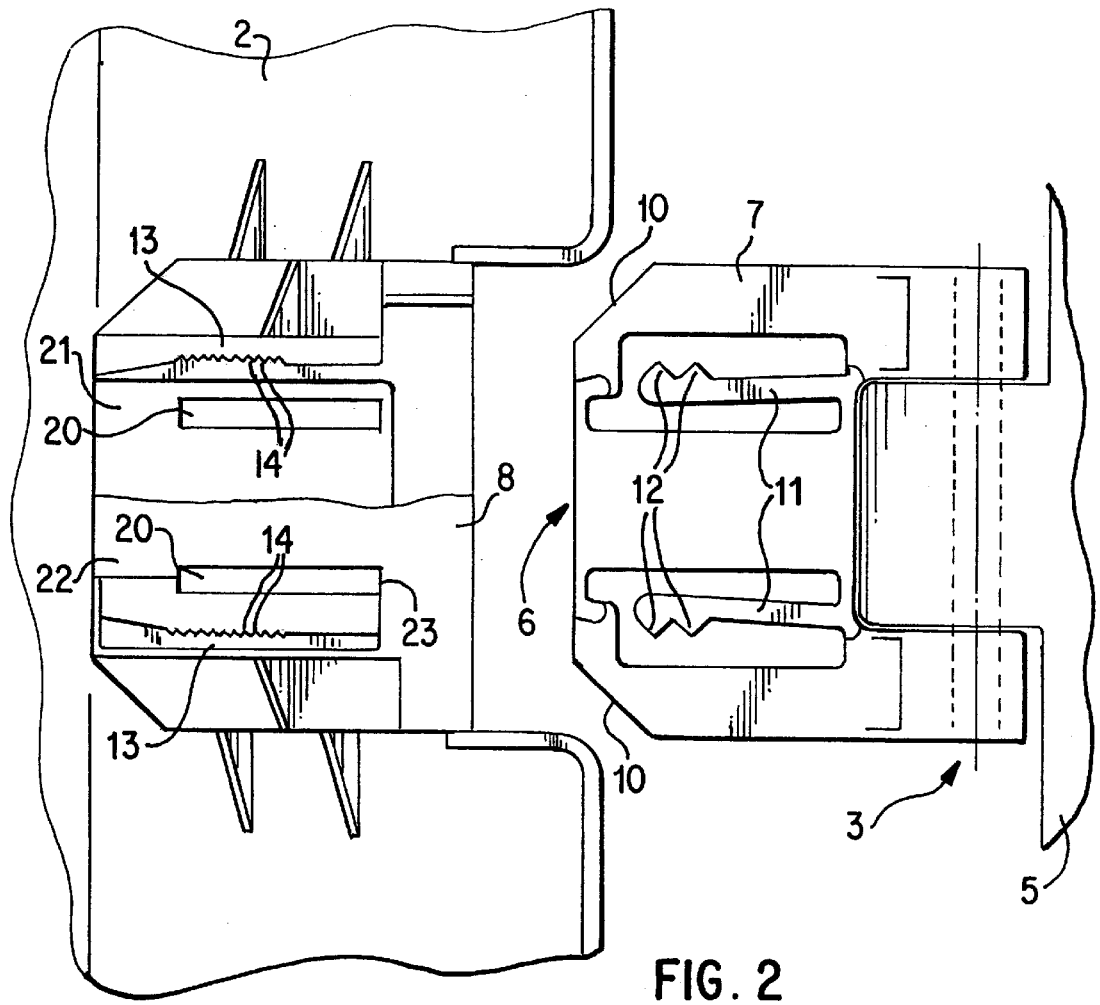
FIG. 2 is a schematic view of the assembly according to FIG. 1, with the tongue disposed ready for insertion.
Figure 3:
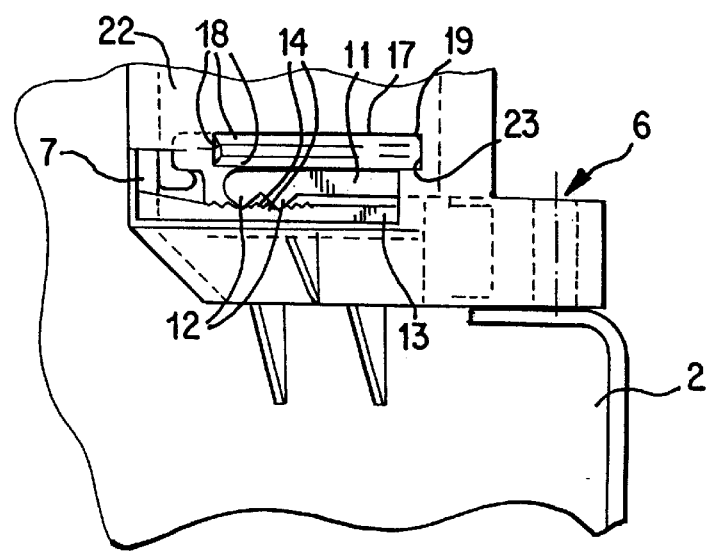
FIG. 3 is a schematic view which shows a detail of the assembly of FIG. 2, with the tongue inserted and secured.

As can be seen in particular in FIG. 2, the tongue 7, which is equipped with two bevels 10 at the end for easier insertion into the channel 8, is provided with two integrally formed-on webs 11 which each bear two consecutive teeth 12. Two rows of teeth 13, assigned to the teeth 12, are integrally formed on the wall of the channel 8 in the insertion direction of the tongue 7, the tooth spacing and also the tooth height of which are many times smaller than that of the teeth 12. This has the result that when the tongue 7 is initially inserted into the channel 8, which still takes place with the glove compartment cover 1 open, starting from a specified insertion depth the teeth 12 engage in a spring-loaded manner into the tooth spaces 14 of the respectively assigned row of teeth 13.

The glove-compartment cover 1 is then closed and its vertical alignment carried out by manual manipulation of the glove-compartment cover. During this vertical alignment, the cover 1 is still mounted in a non-secured manner in that the screwed connections 4A are either loose or not in position. Owing to the spring-loaded engagement of the teeth 12, they are elastically displaceable in the vertical direction towards the adjacent teeth 12 on the fixed dashboard part for the purpose of obtaining a uniform joint spacing. Owing to the very small sized spacing of the teeth of each row of teeth 13, this adjusting process can be carried out in small steps to match the given requirements. Since the cover 1 is closed during this vertical adjustment process, a precise alignment of the cover 1 with adjacent dashboard structure can be achieved in a simple and reliable manner by manual movement of the cover, without requiring any tools.

The adjustment position obtained in this manner does not change unintentionally, owing to the spring-loaded engagement of the teeth 12, when the glove-compartment cover 1 is opened for subsequent insertion of a securing member 15. The securing member 15 for securing the alignment position of the glove-compartment cover 1 is designed as a U-shaped clip 16, the two protruding limbs 17 of which not only have approach bevels 18 but also a lug 19. Clip 16 is pushed with its two limbs 17 into opposite slots 20 in the two wide walls 21 and 22 of the channel 83. The two webs 11 and hence also the teeth 12 are consequently pushed more strongly in the direction of the rows of teeth 13 to securely lock the teeth 13 and 12 in the adjusted position. When the final insertion position of the clip 16 is reached, the lugs 19 engage over assigned latching points 23 of the wall 21, thus securing the clip 16 against unintentional release. The screw connections 4A can then be tightened to further secure the adjusted position of the cover and hinge assembly.

Figure 4:
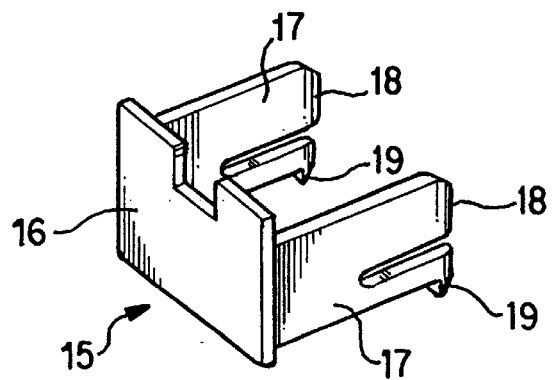
FIG. 4 shows a perspective view of the clip used to secure the vertical adjustment position of the glove compartment cover in the embodiment of FIGS. 1–3.
Figure 4A:
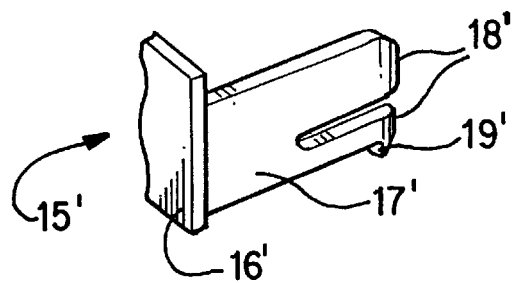
FIG. 4A is a perspective view of an alternative embodiment of a clip for use in securing the vertical adjustment position of the glove-compartment cover.

FIG. 4A illustrates an alternative embodiment of a locking member 15' in the form of a T-shaped clip 16' which includes a single limb 17' having approach bevels 18' and a lug 19' corresponding to each of the limbs 17 of the FIG. 4 embodiment. A corresponding single slot, corresponding to the slots 20 of the embodiments of FIG. 1–4, is provided on the channel walls. Other locking members with more than two limbs are also contemplated according to other preferred embodiments of the invention.

Alternative embodiments are also contemplated for the tongue and adjusting teeth configuration corresponding to the tongue 7 and rows of teeth 13. Such alternative embodiments include a single web corresponding to the two webs 11 and a corresponding single row of teeth 13. Embodiments are also contemplated with more than two webs, like web 11 of FIG. 2, and corresponding rows of teeth, like rows of teeth 13.

In the illustrated preferred embodiment of FIGS. 1–4, the hinges 3 include two separate hinge leaves mounted on a common pivot axis A—A which carries the cover 1. Alternative embodiments with a unitary plastic hinge member having appropriate dimensioning for forming the hinge pivot connection for the cover are also contemplated. Such unitary hinge members would in some instances be more economical to produce and still provide adequate performance. Further embodiments are also contemplated with a unitary plastic member forming both hinges 3 and their hinge leaves.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Hinge for a glove-compartment cover in motor vehicles, comprising:

two hinge leaves coupled in an articulated manner, one of said hinge leaves being fixable such that it is secured in a vertical direction by inserting a tongue coupled to the hinge in an articulated manner into a channel which is preferably assigned to a main body part of the motor vehicle, the other of said hinge leaves being fastenable to a fixed bodywork part of the vehicle after an alignment has taken place in the longitudinal direction of the vehicle and transversely thereto, and a device for aligning the glove-compartment cover in the vertical direction, wherein the device for vertical alignment is designed as at least one tooth which protrudes from the tongue and engages on insertion into the channel in a spring-loaded manner into a row of teeth having formed therebetween a tooth space on the channel aligned in the insertion direction of the tongue for engaging with the at least one tooth that protrudes from the tongue, and wherein the at least one tooth of the tongue is acted on by a securing member biasing the said at least one tooth against an adjacent interengageable tooth space of the row of teeth on the channel.

2. Hinge according to claim 1, wherein two spaced-apart rows of teeth which face one another are provided on the device for vertical alignment, and wherein two consecutive teeth of said tongue engage into each row of teeth on the channel.

3. Hinge according to claim 2, wherein the spacing of the teeth in the rows of teeth on the channel is many times smaller than that of the teeth on the tongue.

4. Hinge according to claim 1, the channel further having two wide walls which lie opposite one another, the walls having slots formed therein, wherein the securing member is designed as a U-shaped clip having two limbs extending outwardly from the U-shaped clip, the two limbs of said clip being configured to protrude through the slots in the two wide walls of the channel.

5. Hinge according to claim 4, wherein the clip has approach bevels and integrally formed-on lugs, said lugs engaging over latching points on side wall portions of the channel on reaching a securing position.

6. Hinge according to claim 1, wherein the teeth are configured to accommodate manual adjustment of said tongue and channel without tools and with said cover in a closed position and to hold said tongue and groove in said adjusted position when said cover is opened to accommodate completion of the assembly.

7. A cover flap and hinge assembly for a motor vehicle compartment opening, comprising:
a cover flap,
a hinge tongue connected to the cover flap,
a hinge tongue mounting channel fixable in position on a vehicle body of the motor vehicle,
at least one set of first adjusting teeth on the channel,
at least one set of second adjusting teeth on the hinge tongue,
said first and second sets of adjusting teeth being configured to elastically interengage and thereby accommodate adjusting of the hinge tongue in said channel by manual movement of the cover flap while in its closed position.

8. An assembly according to claim 7, comprising a manually movable locking member operable to lock said adjusting teeth in an adjusted position.

9. An assembly according to claim 8, wherein said at least one set of first adjusting teeth, includes a set of first adjusting teeth spaced from one another in an axial tongue insertion direction,
and wherein said at least one set of second adjusting teeth includes a set of second adjusting teeth spaced from one another in the tongue axial insertion direction of the first adjusting teeth when said tongue is inserted into said channel for mounting the tongue and cover flap in position.

10. An assembly according to claim 9, wherein said adjusting teeth on the channel have a different spacing than said adjusting teeth on the tongue.

11. An assembly according to claim 7, further comprising:
a hinge leaf section connected to the tongue and extending at an angle with respect to the tongue, and
a fastener for adjustably fastening said hinge leaf section to fixed vehicle body parts.

12. An assembly according to claim 11, wherein the cover flap is disposed to cover a glove box opening, and wherein said fastener is a threaded fastener which is accessible from inside the glove compartment covered by said cover flap.

13. An assembly according to claim 11, wherein said fastener and said hinge leaf section are configured to accommodate adjusting of said hinge leaf section in a plane extending substantially perpendicular to a tongue insertion direction of said channel.

14. An assembly according to claim 13, wherein the cover flap is disposed to cover a glove box opening, and wherein said fastener is a threaded fastener which is accessible from inside the glove compartment covered by said cover flap.

15. An assembly according to claim 7, wherein respective ones of said hinge tongues and mounting channels are provided at respective opposite sides of a glove compartment opening of a motor vehicle, said cover flap being configured to selectively open and close said glove compartment opening when in an in-use installed condition on the motor vehicle.

16. A method of making a selectively openable compartment in a motor vehicle, comprising:
providing a compartment which is fixably disposable in the motor vehicle and which has a compartment opening at one side thereof,
providing a mounting channel in a relatively fixed body part, adjacent said compartment opening, including providing at least one set of first adjustment teeth on the channel,
providing a cover flap and hinge assembly, said hinge assembly defining a pivot axis for the cover flap and including first and second hinge leaves extending at different angles from said hinge pivot axis, said first hinge leaf being formed as a tongue with at least one set of second adjusting teeth,
manually inserting said tongue into said mounting channel to a position where said first and second adjusting teeth elastically interengage to temporarily hold the cover in position,
subsequently closing said cover and manually adjusting the end position of said cover by manual manipulation of said cover and without tools, with consequent relative movement of the first and second adjusting teeth accommodating and maintaining the respective adjusted position of the cover,
opening said cover with said adjusting teeth holding said cover in the adjusted position,
and manually securing said adjusted position.

17. Method according to claim 16, wherein said manually securing includes insertion of a locking clip which abuttingly engages one of said mounting channel and said tongue to lock said first and second adjusting teeth in said adjusted position.

18. A method according to claim 17, further comprising fixedly securing said second hinge leaf to a fixed vehicle body part while said adjusting teeth hold said tongue and cover in the adjusted position.

19. A method according to claim 18, wherein said fixedly securing said second hinge leaf includes tightening of a threaded member to clamp the second hinge leaf to said fixed vehicle part.

20. A method according to claim 16, wherein said method includes providing two sets of said hinge assemblies at respective spaced positions on the cover flap corresponding to opposite lateral sides of the compartment opening,
and wherein said manually inserting includes simultaneously inserting both tongues in respective ones of said channels disposed at opposite lateral sides of the compartment opening.

21. A method according to claim 16, wherein said tongue includes an integrally formed limb with said second adjusting teeth, said limb being elastically movably disposed with respect to adjacent structure of said tongue.

22. A method according to claim 21, wherein said tongue includes two of said limbs spaced transversely of one another with respect to the insertion direction of the tongue in the channel.

23. A method according to claim 22, wherein said method includes providing two sets of said hinge assemblies at respective spaced positions on the cover flap corresponding to opposite lateral sides of the compartment opening,
and wherein said manually inserting includes simultaneously inserting both tongues in respective ones of said channels disposed at opposite lateral sides of the compartment opening.

24. Hinge according to claim 1, the channel further having two wide walls which lie opposite one another, the walls having slots formed therein, wherein the securing member is designed as a T-shaped clip with a limb being configured to protrude through the slots into the two sidewalls of the channel.

25. An assembly according to claim 8, the channel further having two wide wall which lie opposite to each other, the walls having slots formed therein, wherein said manually movable locking member is designed as a U-shaped clip having two limbs extending outwardly from the U-shaped clip, the two limbs of said clip being configured to protrude through the slots in the two wide walls of the channel.

26. An assembly according to claim 8, the channel further having two sidewalls which lie opposite to each other, the walls having slots formed therein, wherein said locking member is designed as a T-shaped clip with a limb being configured to protrude through the slots into the two sidewalls of the channel.

27. A method according to claim 17, the channel further having two wide walls which lie opposite one another, the walls having slots formed therein, wherein the securing member is designed as a U-shaped clip having two limbs extending outwardly from the U-shaped clip, the two limbs of said clip being configured to protrude through the slots in the two wide walls of the channel.

28. A method according to claim 17, the channel further having sidewalls which lie opposite one another, the walls having slots formed therein, wherein the securing member is designed as a T-shaped clip with a limb being configured to protrude through the slots into the two sidewalls of the channel.

* * * * *